United States Patent Office 2,867,651
Patented Jan. 6, 1959

2,867,651

PURIFICATION OF ALCOHOLS AND PRODUCTION OF ESTERS IN THE PRESENCE OF BOROHYDRIDES

Robert H. Wise, Hammond, Ind., assignor to Standard Oil Company, Chicago, Ill., a corporation of Indiana No Drawing. Application October 24, 1955
Serial No. 542,521

27 Claims. (Cl. 260—475)

This invention relates to a process for the treatment of impure alcohols, and especially to a process for the purification of alcohol products and chemical derivatives thereof with respect to color properties. More particularly, this invention is directed to a novel contacting process for the purification of synthetic alcohol products derived from reaction of mixtures containing carbon monoxide and hydrogen. This invention has particular application to the purification of water immiscible alcohols having from 4 to 15 carbon atoms which are obtained as products of the reaction of olefinic compounds and mixtures of hydrogen and carbon monoxide under suitable conditions well known in the art as the Oxo synthesis.

The catalytic hydrogenation of carbon monoxide via the Fischer-Tropsch synthesis to produce chiefly aliphatic hydrocarbons results in the production of substantial amounts of alcohols as well as minor amounts of other oxygenated products such as ketones, fatty acids, esters and the like. Research on the Fischer-Tropsch process led to the discovery of the Oxo process for the addition of carbon monoxide and hydrogen to olefins to produce a particular alcohol having 1 carbon atom more than the olefinic feed-stock.

I have discovered that impure alcohols such as those obtained from the above synthesis processes and especially the Oxo synthesis can be purified as to color and color producing impurities by treatment with certain solid complex borohydride compounds or their aqueous solutions as hereinafter described. The purification treatment may be conducted simultaneously with a distillation step whereby the purified alcohol is separated from the crude alcohol feedstock, or may be utilized as a finishing operation to improve the color and remove color-forming impurities from the previously distilled alcohol.

It is an object of this invention to provide a process for improving the color of synthetic alcohols. It is a further object to improve the color of synthetic alcohols derived from the reaction of carbon monoxide and hydrogen with or without added olefins. It is another object of this invention to improve the color and to remove color-forming impurities from alcohols produced from olefins by the Oxo process. Another object is to provide a simple and effective method for finishing synthetic alcohols so as to improve their color and remove color-forming impurities therefrom. Still another object is to provide a method for improving the color of esters derived from synthetic alcohols. A further object is to improve the plasticizing properties of esters derived from synthetic alcohols produced by the Oxo process. Other objects of my invention will be apparent from the ensuing description thereof.

The synthesis of oxygenated organic compounds from mixtures of carbon monoxide and hydrogen may be accomplished by reaction of these gases alone, in which case the reaction is known as the Fischer-Tropsch synthesis, or by reaction of mixtures of these gases with olefins, in which case the reaction conditions are usually those employed in the well known Oxo synthesis. In the Fischer-Tropsch synthesis the major product of the reaction comprises hydrocarbon compounds and the synthesis is particularly adapted to the production of synthetic gasoline. A major by-product of the process comprises mixtures of alcohols from which appreciable quantities of water-immiscible alcohols may be separated.

The conversion of an olefin to an alcohol having one more carbon atom per molecule may be accomplished in a one-step Oxo reaction as described in U. S. Patent No. 2,683,177 of E. Field, or as more generally practiced, in a two-step process. In the two-step process an olefin such as a heptene or octene is reacted with carbon monoxide and hydrogen at high pressure in the presence of a carbonyl forming metal catalyst such as cobalt to yield an aldehyde with one more carbon atom per molecule, as well as minor amounts of other oxygenated products such as ketones and acids together with some condensed higher molecular weight products such as acetals, aldols, hemiacetals and esters. In the second step of the Oxo synthesis the products formed in the first step are hydrogenated primarily to convert the aldehyde into alcohol after which the hydrogenated products are usually fractionated to produce an alcohol fraction, a lower boiling hydrocarbon fraction and a higher boiling fraction.

While the process of my invention is equally applicable to the purification of water immiscible alcohols derived either as by-products from Fischer-Tropsch gasoline synthesis or as primary reaction products of the Oxo synthesis, inasmuch as the latter is a preferred feedstock herein the invention is described in detail as applied to the purification of alcohols produced by the Oxo synthesis.

The conversion of olefinic compounds to alcohols having one more carbon atom by the Oxo synthesis as described above is particularly effective for the preparation of primary alcohols having from 4 to 15 carbon atoms. Olefinic materials suitable as feedstocks may be obtained by well known processes, such as the cracking of hydrocarbons or waxes, synthesis from carbon monoxide and hydrogen via the Fischer-Tropsch process, dehydrohalogenation of halogenated hydrocarbons, polymerization of gaseous olefins over suitable catalysts, and the like.

The alcohols having from 4–12 carbon atoms, and especially the octanols, nonanols and decanols, are particularly valuable for the preparation of esters, by reaction with dibasic aliphatic or aromatic acids, or their anhydrides such as phthalic anhydride or maleic anhydride. These esters are widely used as components of plastic compositions, and especially as plasticizers for a wide variety of resinous materials which form clear plastics such as polyvinyl halide polymers and copolymers, cellulose acetate, and the like.

Serious difficulties have been encountered in the purification of alcohols prepared by the Oxo synthesis in order to render them sufficiently pure for conversion to high-quality esters suitable as components of plastic compositions. Thus it has been found that the alcohol product obtained by distillation of the crude alcohol from the hydrogenation stage is not always of a satisfactory water-white color. Another difficulty that has been experienced is that the alcohols when esterified may undergo a color change which is also undesirable. For example it has been found in the case of an octyl alcohol that this compound when esterified with phthalic acid or its anhydride to form an ester may form a product having an undesirable color. Since large quantities of Oxo process alcohols, and particularly those having 8–10 carbon atoms are utilized in the production of esters which are used for plasticizing resins, it can be seen that an ester of undesirable dark color will adversely affect the color of the resin with which it is compounded. Such effects are particularly deleterious in the compounding of vinyl resin compositions which may contain as much as 50% by weight of plasticizer, in that color will be imparted to products made therefrom, or difficulty encountered in obtaining uniform and reproducible color compositions in which pigments or dyes are incorporated.

In the manufacture of plasticizers by the reaction of dicarboxylic acids or their anhydrides with synthetic alcohols, the reactants are generally heated together at high temperatures for extended periods of time. Typically, in the esterification of phthalic anhydride with octyl alcohol, the anhydride is heated at an elevated temperature with a molar excess of the alcohol, e. g. 2.0 to 2.4 mols of alcohol per mole of phthalic anhydride, until esterification is substantially complete. The esterification reaction may be conducted in the absence of a catalyst, or in the presence of a minor proportion of a catalyst such as sulfuric acid or toluenesulfonic acid, in which case the period of reaction and temperature of reaction are substantially reduced. During the reaction, water of esterification, together with a portion of the excess alcohol, is distilled overhead, such removal of water facilitating completion of the reaction. When esterification is substantially complete, as indicated by the reduced acid number of the reaction mass, any remaining alcohol may be removed, as by distillation, and the product worked up by known methods, including such steps as neutralization, drying, steam-stripping to remove volatile material, and vacuum distillation.

The diester products so formed are generally high boiling liquids which are difficult to purify by fraction distillation because of their tendency to decompose and become colored unless an extremely high vacuum is employed during distillation. Thus in the production of esters it is preferred to utilize a purified alcohol having substantially reduced tendency to form colored esters and which will yield an esterification product which on neutralization and removal of volatiles comprises a pure, colorless ester of plasticizer grade, thus avoiding the costly and yield-reducing step of vacuum distillation.

The wide scale use of Oxo process alcohols for esterification of dicarboxylic acids as described above has led to the adoption of a number of standard accelerated tests for determining the purity of such alcohols. These tests are indicative of the color-forming properties of the alcohols and may be used to predict the color-forming tendency of alcohols produced by the Oxo or other synthetic processes when used in esterification processes of the type described. Two such tests which I have found particularly useful will now be described.

PHTHALATION COLOR TEST FOR ALCOHOL STABILITY 2.3 g. of pure, sublimed phthalic anhydride is weighed into a 50 cc. ASTM oil emulsion tube. 5 cc. of alcohol to be tested is added, washing the anhydride down the side of the tube. The tube is then placed in an insulated aluminum block having internal heating elements which maintain the block at a temperature of 125° C.±0.5° C. The tube is retained in the block for 12 minutes, the anhydride rapidly stirred into solution, and the tube removed. 0.02 cc. of 50% by volume concentrated sulfuric acid is added via a 20 lambda micro pipette, and the mixture agitated for 15 seconds and returned to the block. The tube is retained in the block for 1½ hours from the time of completion of the stirring. The ester is then cooled and 5 cc. of C. P. acetone added, then agitated till clear, and poured into a Gardner color comparison tube to the lower mark. The color is compared with Pt—Co standards in accordance with ASTM D–268–49, and recorded as Hazen value to the nearest 25 units. Colors slightly above the color of the nearest standard tube are recorded as "+" values, while colors slightly less than the nearest standard tube are recorded as "—" values.

FIRST STAGE AND FINAL ESTER COLOR TEST

One pint of alcohol (10% excess) is esterified with 187 g. of phthalic anhydride at 140–175° C. in the presence of 0.5 ml. of 96% sulfuric acid in a standard reaction flask provided with a reflux condenser and means for removing water of esterification, as well as an inlet tube to provide for entry of $CO_2$ gas, which is admitted at the rate of 1 cu. ft./hr. At 95% esterification, a sample is taken for determination of First Stage Ester Color, in accordance with ASTM D–268–49. The ester is then neutralized with caustic, washed free of caustic, and steam stripped to remove excess alcohol. The oil is then treated with 0.5% by weight of activated carbon (Grade-Matheson Practical) and an equal weight of Dicalite filter-air, and filtered to obtain a sample for Final Ester Color, which is determined by comparison with Pt—Co standards. Color is reported as Hazen value to the nearest 25 units.

A number of methods have been previously proposed to improve the quality of the alcohol product derived from the Oxo process. For example, the alcohol product obtained by fractional distillation of the effluent from the hydrogenation stage may be refractionated to obtain a more highly purified product, but this method is attended by a greatly decreased yield of alcohol product. Another method of purification that has been suggested is the rehydrogenation of the alcohol fraction obtained by distillation of the crude alcohol product. Various methods for the chemical treatment of Oxo process alcohols have likewise been proposed, such as washing with aqueous caustic solution, aeration of the alcohol product in the presence of hot aqueous caustic solution, or by treatment with various metals such as nickel, copper or mercury. These methods of purification all suffer from the disadvantages of increased handling of the alcohol and reduced yield of product, resulting in a concomitant increase in the cost of manufacture of the alcohol.

It has now been found that the color of synthetic alcohols, for example alcohols produced by the Oxo process, as well as the color of esters made therefrom, can be substantially improved by a simple contacting process in which process the alcohol is contacted with a complex borohydride selected from the group consisting of alkali metal borohydrides and alkaline earth metal borohydrides. A preferred group of treating agents comprise the borohydrides of lithium, sodium and potassium; the borohydrides of calcium, magnesium and barium are also effective. Ammonium ion because of its similarly in chemical behavior to the sodium and potassium ions may be considered a member of the alkali metal group. By this treatment the undesirable color-forming properties of the alcohols can be substantially eliminated, and a grade of alcohol produced which is eminently suited for preparation of plasticizers of high quality and stability.

The complex borohydrides which are used in the process of my invention are solid materials which react slowly, if at all, with water or alcohols. A number of them, for example sodium borohydride and potassium borohydride, may be dispersed or dissolved in water or in basic aqueous solutions without appreciable decomposition. They may be handled or stored in air without substantial loss of purity.

While the process of my invention is preferably conducted as a two-phase liquid-solid contacting process, in which the borohydride compounds described herein act as solid treating agents, it is within the scope of my invention to utilize dilute aqueous solutions of those borohydride complexes which react slowly, if at all, with water, such as potassium borohydride and sodium borohydride. Such aqueous solutions exhibit remarkable stability, due in part at least to the alkalinity of the solution that results from the initial hydrolysis of a small amount of the borohydride material.

The beneficial effects of my process may be obtained by intimately contacting a crude synthetic alcohol with the solid treating agents of my invention. By the expression "crude synthetic alcohol" I mean the alcohol obtained by the reaction of olefinic compounds with hydrogen and carbon monoxide, or as a by-product of the Fischer-Tropsch gasoline synthesis, and having an undesirably high Phthalation Color. In a preferred embodiment of my invention the crude alcohol may be first subjected to a preliminary vacuum distillation to separate low boiling hydrocarbon compounds as well as higher boiling condensation products as residue from the desired alcohol, which is obtained as a desired fraction of the distillate.

The crude alcohol is contacted with the solid treating agents of my invention in any conventional manner. For example, such contacting may be achieved by vigorous agitation of the crude alcohol to which has been added the desired proportion of borohydride compound, or the crude alcohol may be passed continuously through a column or chamber packed with borohydride complex. The solid treating agent may be used alone, or may be intimately mixed with an inert filtering medium or support such as clay, diatomaceous earth, and the like in order to facilitate contacting and permit even distribution and flow of the alcohol through the treating column. In one aspect, the treating agent, intimately admixed with an inert filtering agent, may be distributed as a coating on a leaf filter or laid down as a packing in a plate and frame filter press, and the crude alcohol pumped therethrough in accordance with the conditions prescribed for my process.

With regard to the proportions of treating agent used in contacting the alcohol, variations will be found depending upon the exact source of the alcohol, the treating agent being used, the temperature and the initial quality of the alcohol being treated. It has been found that from about 0.001 to about 0.1% by weight of treating agent based on the amount of alcohol being treated will in most cases be adequate, but substantially greater quantities of treating agent, for example, up to 1% by weight or more based on the alcohol treated may be employed without harmful effect.

The time of contact necessary to produce an alcohol of sufficient purity to be utilized in the production of esters meeting the required standards of color and purity varies, depending on the concentration and kind of impurities in the alcohol as well as on the quantity of treating agent employed, the degree of contacting achieved and the temperature conditions employed. It has further been found that the rate of color improvement of the alcohol varies depending upon the particular borohydride complex compound utilized as the treating agent. Thus the rate of color removal obtained by the use of lithium borohydride is considerably more rapid than that obtained by treatment with sodium borohydride. A contact period of 3 minutes can sometimes be employed. A contact time of a few minutes has been found to be effective at temperatures above the ambient temperature while under less drastic treating conditions and more impure alcohol feedstock the time required for effective treatment may be from about 1 to 4 hours.

The temperature at which the treating operation is carried out is not considered to be critical, but should preferably be chosen to give maximum improvement in alcohol quality within a reasonable length of time, it being realized that temperature of treatment and time of treatment are inversely related variables. In general any temperature from about 0° C. to about 150° C. or even higher, for example up to the boiling point of the alcohol, may be employed. I prefer to employ a temperature in the range of from about 25° C. to about 100° C. Here again it must be realized that the optimum treating conditions will be determined by the quality of the original crude alcohol, more elevated temperatures being required in these cases where a more impure alcohol feedstock is treated.

The treatment is generally conducted at or near atmospheric pressure, although elevated pressures or even sub-atmospheric pressures may be employed. Where the crude alcohol comprises the unfractionated effluent from the hydrogenation stage of the Oxo process, the presence of various low boiling constituents in the mixture having appreciable vapor pressure at the temperature of treatment may dictate the use of somewhat elevated pressures in order to maintain liquid-solid contact conditions, as for example pressures of up to 100 p. s. i. g. Since it is likewise within the scope of my process to treat the crude alcohol with the solid contacting agents of my invention concurrently with a distillation step to recover a purified and color-stable alcohol distillate fraction, the contacting of the alcohol with the solid treating agents may be achieved under reduced pressure conditions necessary to effect fractional distillation of the alcohol.

*Example 1*

A typical treatment which gives products having improved color stability is carried out by treating crude isooctyl alcohol obtained by the Oxo process and having color-forming impurities with 0.01% of sodium borohydride reagent. The crude alcohol employed in this example was obtained by fractionally distilling the effluent from the second stage of a two-stage Oxo process to obtain an isooctyl alcohol fraction having a Phthalation Color of 225 and a First Stage Ester Color of 55–60. The crude alcohol and powdered sodium borohydride treating agent were vigorously stirred together for a period of 2 hours at a temperature of 25° C. At the end of that time, a small amount of Celite filter aid was added, and the alcohol filtered. The filtrate was found to have a Phthalation Color of 100 Hazen and First Stage Ester Color of 15–20.

In a second experiment a distilled sample of decyl alcohol of Oxo process origin having a Phthalation Color of 275 was similarly treated, resulting in a purified alcohol of 50–75 Phthalation Color.

*Example 2*

The effect of temperature of treatment and time of treatment on the purification of Oxo process alcohols are demonstrated by reference to hte following table. In the tests on which this table is based, an isooctyl alcohol obtained as in Example 1 and having an initial Phthalation Color of 250 and a First Stage Ester Color of 65 was treated with 0.01% of sodium borohydride at the indicated temperatures for varying periods of time. The treated alcohol was filtered as in Example 1 prior to determination of final color.

| Temp. | Time, minutes | Phthalation Color | 1st Stage Color |
|---|---|---|---|
| 27° C. | 0 | | |
| | 30 | 200– | |
| | 60 | 125 | |
| | 90 | 100 | |
| | 120 | 100 | 10–15 |
| 66° C. | 15 | 125 | |
| | 30 | 100 | |
| | 45 | 75 | |
| | 60 | 50–75 | 5–10 |

As indicated in the above table, appreciable improvement in alcohol quality is obtained at 27° C. after a treating period of 30 minutes. Continued treatment of the alcohol works a further improvement in alcohol quality until a final Phthalation Color of 100 is reached. At the more elevated temperature of 66° C., improvement in alcohol quality is more rapid and more complete, as indicated by the marked reduction in Phthalation Color after 15 minutes and the excellent color of 50–75 achieved after 1 hour of treatment.

Example 3

This example demonstrates the effect of varying the metal ion of the borohydride complex used in the treatment of Oxo process alcohols in accordance with the process of my invention. A crude $C_8$ Oxo alcohol obtained as in Example 1 and having an initial Phthalation Color of 250 was treated by stirring at 20–25° C. with the indicated quantity of borohydride treating agent. Samples were withdrawn from the reactor mixture at specified intervals and washed with water to stop the reaction by removal of the active component. Phthalation Ester Color was determined for the washed and dried sample.

| Time of Treatment, min. | Treating Agent | | |
|---|---|---|---|
| | .01% NaBH$_4$ | 0.01% LiBH$_4$ | .03% CaCl$_2$ + 0.01% NaBH$_4$ |
| 5 | | | |
| 10 | | 50 | |
| 15 | 160 | | 225 |
| 20 | | | |
| 25 | | 25+ | |
| 30 | 75− | | 200 |
| 40 | | 25+ | |
| 90 | | | 50 |
| 110 | | 25 | |

A marked increase in the rate of reduction of ester color is apparent for LiBH$_4$ as compared with NaBH$_4$. Although the reason for the improved rate of purification of crude alcohol when the lithium complex is used is not known with complete certainty, it may in part be attributed to the greater solubility of lithium borohydride or of intermediate products of reactions of LiBH$_4$ in isooctyl alcohol of Oxo process origin as compared with sodium borohydride at the same temperature.

Example 4

A sample of octyl alcohol obtained as in Example 1 is treated with 0.01% KBH$_4$ at 25° C. for 2 hours. A marked improvement in Phthalation Color is obtained.

Example 5

This example demonstrates the improved heat stability of esters prepared from alcohols purified in accordance with the process of my invention.

A sample of octyl alcohol obtained as in Example 1 was treated by stirring with 0.01% by weight of sodium borohydride at 25° C. for four hours. The alcohol was then filtered to remove unreacted solid treating agent, and the alcohol washed and dried. The treated alcohol, as well as a sample of untreated alcohol, was esterified with phthalic anhydride in the presence of a trace of sulfuric acid by the method described above for determination of Final Ester Color. The heat stability of the esters so formed was determined by heating a sample of each ester at 205° C. in an aluminum block for 2 hours in an open test tube.

| Sample | Initial Ester Color | Ester Color After 2 hrs. at 205° C. |
|---|---|---|
| (1) Untreated alcohol | 25 | 700 |
| (2) Treated alcohol—.01% NaBH$_4$ at 25° C. for 4 hrs. | 10 | 350 |
| (3) Commercial "isooctyl alcohol" | 10 | 800 |

As will be noted, the phthalic acid ester produced from treated alcohol not only has an improved initial color, but is far more stable when heated at elevated temperature than the ester obtained from untreated alcohol. A typical sample of commercial isooctyl alcohol when similarly treated gave an ester which became much more deeply colored after heating under similar conditions. The data also indicate the substantial improvement in initial alcohol color obtained by borohydride treatment of the crude alcohol.

Since one of the major uses of alcohols produced by the Oxo process is in the production of esters such as the phthalic acid diesters which are utilized as plasticizers for vinyl resins, in which use the esters are generally heated with the resin at elevated temperatures in order to produce plastic compositions, the remarkably improved heat stability of esters produced from alcohols treated by the process of my invention constitutes a valuable improvement of great commercial utility.

Example 6

This example demonstrates that alcohols of extremely poor quality as indicated by high Phthalation Color may be effectively purified by the treatment described herein.

An octyl alcohol of Oxo process origin and having an initial Phthalation Color of 750+ was stirred at 50° C. for 3 hours with 8.3% by weight of sodium borohydride. The product was washed free of unchanged reagent and phthalated. The final Phthalation Color of the alcohol was 100.

Example 7

Alcohol of extremely poor quality may be effectively improved by successive treatments with borohydride complexes as shown in this example.

An octyl alcohol having a Phthalation Color of 1000–1500 was subjected to two successive treatments by stirring with aqueous sodium borohydride at 50° C. After the first treatment, a sample of the dried alcohol had a Phthalation Color of 750+. After the second treatment, the Phthalation Color had been reduced to 400+.

The treating agents of my invention may be employed to purify alcohols prior to their use as components of esterification reactions, or may be utilized during the initial stages of the esterification reaction in order to improve the color of the resulting esters and render them more heat stable. For example, it is contemplated that the borohydride complex may be added to the alcohol simultaneously with a dicarboxylic acid or anhydride, such as phthalic anhydride, so as to obtain the purifying advantages of the treating agent during the esterification reaction as shown in Example 8 below. In such case, the products of decomposition of the borohydride complex are removed during the aqueous caustic wash generally utilized as one step of the final purification of the ester product.

Example 8

One pint of octyl alcohol to which was added 0.01% NaBH$_4$ (based on the weight of alcohol used) was treated in accordance with the test for First Stage Ester Color as described above. The crude ester color of the mix at 95% conversion (First Stage Ester Color) was found to be 100 APHA. When the same procedure was used without the sodium borohydride, a crude ester color of 175–200 APHA was obtained. No detrimental effect on esterification rate was noted.

It is contemplated to be within the scope of my invention to carry out successive treatments of impure alcohols with the treating agents of my invention. Such treatment may be followed if so desired by filtration to remove unconverted solid treating agent, or by water washing of the treated alcohol, or by a combination of filtration followed by water washing to remove water-soluble impurities in the alcohol. Minor amounts of boron-containing impurities which remain in the alcohol have been found to exert no deleterious effect on the quality of the purified alcohol, but may be removed if desired by washing with water or with dilute aqueous caustic solutions. Where the alcohols are utilized for the production of esters of dicarboxylic acids, the purification of the ester which ordinarily involves a caustic washing step will serve to effectively remove boron-containing contaminants from the ester product.

The types of alcohol feedstock best suited to this type of treatment are crude alcohol mixtures derived from the Oxo process. These mixtures generally comprise water-immiscible alcohols having four or more carbon atoms, and up to around fifteen carbon atoms. It is contemplated that the process will have the widest and most useful application to purify Oxo alcohols of the $C_8$—$C_{10}$ range, which are those alcohols of most useful and resirable properties for making ester plasticizers. For example, a typical $C_8$ alcohol feedstock which can be purified by the method herein disclosed to give a product yielding ester plasticizers of high purity and improved color stability may be characterized as one produced from the Oxo synthesis using a $C_7$ olefin feed, the resulting crude alcohol having a boiling range of 150° F. to 400° F. Such a feedstock may comprise the total effluent from the single or two-stage Oxo process synthesis, consisting essentially of 20% low-boiling hydrocarbons, 75% of alcohol and aldehyde and 5% high boiling bottoms, or of a fraction thereof obtained by vacuum distillation of the effluent and consisting essentially of primary branched chain alcohols having 8 carbon atoms.

When the purification treatment described herein is applied to an Oxo process effluent which has not been previously fractionated to obtain a distillate consisting essentially of alcohol, the treated feedstock may be filtered to remove undissolved treating agent, and subsequently subjected to fractional distillation, or the treated feedstock may be distilled directly to yield an overhead product of purified alcohol. Such distillation may be accomplished in the presence of the solid treating agents alone, or in the presence of an aqueous slurry or solution thereof in order to promote more intimate contact of the feedstock with the treating agent. Where an aqueous solution or suspension of the borohydride complex is employed, it is advantageous to maintain the pH of the solution above about 7, by addition for example of a small amount of sodium hydroxide, sodium carbonate or other alkaline agent in order to stabilize the borohydride complex against hydrolytic decomposition.

The borohydride treating agents of my invention may be utilized alone, or in the presence of various metal polyvalent halides, for example, the chlorides or bromides of aluminum, gallium, titanium, zirconium and the like.

It will be apparent to one skilled in the art that the treating process of my invention may be used in conjunction with, or as an adjunct to, various other methods of alcohol purification in order to obtain an alcohol product of outstanding purity and color stability, as for example, prior to or following air oxidation of the crude alcohol in the presence of caustic, treatment with solid decolorizing agents such as activated carbon or activated clay, re-hydrogenation or treatment with aldehyde complexing agents such as sodium bisulfite to substantially remove a major portion of carbonyl containing impurities, and the like.

While the process of my invention has been described with reference to synthetic alcohols produced by catalytic reaction of mixtures containing carbon monoxide and hydrogen, and especially those obtained by the Oxo process, it will be appreciated that synthetic alcohols or mixtures containing alcohols deried from other processes of manufacture may be similarly purified. Industrial alcohol products such as those derived by hydration of olefins, by sodium reduction of fatty acid esters, by catalytic hydrogenation of aldehydes produced by aldol condensations and the like may be treated in accordance with the process of my invention to obtain products of improved color and color stability.

Other modifications and modes of applications within the spirit of my invention will be apparent to those skilled in the art.

Having described my invention, what I claim is:

1. A process for the treatment of a water-immiscible alcohol fraction containing at least 4 carbon atoms per molecule produced by catalytic reaction at elevated temperatures of a reaction mixture comprising essentially carbon monoxide and hydrogen, said fraction containing connate impurities, including carbonyl compounds, carboxylic acids and alcohol interaction products thereof, which process comprises contacting said alcohol fraction with a metal borohydride selected from the group consisting of alkali metal borohydrides and alkaline earth metal borohydrides in an effective proportion of at least about 0.001% by weight based on said alcohol fraction and sufficient at least to destroy undesirable impurities in said alcohol fraction which have color-producing tendencies in a subsequent reaction of said alcohol fraction, and effecting said contacting at an effective temperature of at least about 0° C. for an effective period of at least about 3 minutes.

2. The process of claim 1 wherein said alcohol fraction is treated at a temperature between about 25° C. and about 200° C. for an effective period of time between about 3 minutes and about 5 hours, sufficient to destroy undesirable impurities having color-producing tendencies in a subsequent reaction of said alcohol fraction.

3. The process of claim 1 wherein said metal borohydride is employed in the form of an aqueous solution.

4. The process of claim 1 in which said treatment is effected in the presence of a polyvalent metal halide of a metal selected from the class consisting of calcium, aluminum, gallium, titanium and zirconium.

5. The process of claim 4 wherein said polyvalent metal halide is calcium chloride.

6. The process of claim 4 wherein said polyvalent metal halide is aluminum chloride.

7. The process of claim 1 which includes the supplementary step of treating said alcohol fraction with a solid decolorizing agent.

8. The process of claim 7 wherein said decolorizing agent is activated clay.

9. A process for the treatment of a water-immiscible alcohol fraction containing at least 4 carbon atoms per molecule produced by catalytic reaction at elevated temperatures of a reaction mixture comprising essentially carbon monoxide and hydrogen, said fraction containing connate impurities, including carbonyl compounds, carboxylic acids and alcohol interaction products thereof, which process comprises contacting said alcohol fraction with a metal borohydride selected from the group consisting of alkali metal borohydrides and alkaline earth metal borohydrides in an effective proportion not exceeding about 1% by weight of said alcohol and sufficient at least to destroy impurities, thereby to produce an alcohol fraction having a first-stage phthalate ester color not exceeding about 25 APHA, effecting said contacting at an effective temperature of at least about 0° C. for an effective period of at least about 3 minutes.

10. The process of claim 9 wherein said metal borohydride is an alkali metal borohydride.

11. The process of claim 10 wherein said borohydride is sodium borohydride.

12. The process of claim 10 wherein said borohydride is lithium borohydride.

13. A process for the treatment of an alcohol fraction containing between about 4 and about 15 carbon atoms per molecule prepared by the Oxo process, in which an olefin is catalytically hydroformylated at an elevated temperature and the hydroformylation product is catalytically reduced to produce said alcohol fraction, which process comprises subjecting said alcohol fraction to fractional distillation to remove therefrom substantially all components other than those boiling within the boiling range of said alcohol fraction, thereby obtaining an alcohol fraction containing connate impurities, including carbonyl compounds, carboxylic acids and alcohol interaction products thereof contacting the alcohol fraction thus produced in the liquid phase with with at least about 0.001% by weight of a metal borohydride selected from the group consisting of alkali metal borohydrides and alkaline earth metal borohydrides at an effective temperature of at least about 0° C. for an effective period of time of at least about 3 minutes, and thereafter separating a purified alcohol having a substantially reduced phthalation color.

14. The process of claim 13 wherein said alcohol fraction is subjected to a fractional distillation operation following the treatment with metal borohydride.

15. The process of claim 13 wherein said metal borohydride is employed in the form of an aqueous solution.

16. The process of claim 13 in which the alcohol is a $C_8$ alcohol and the aqueous solution contains from about 0.001% to about 0.1% of sodium borohydride based on the weight of alcohol treated.

17. The process of claim 13 in which the alcohol is a $C_8$ alcohol and the aqueous solution contains from about 0.001% to about 0.1% of potassium borohydrides based on the weight of alcohol treated.

18. A process for the treatment of an impure $C_4$—$C_{15}$ alcohol fraction produced by fractional distillation of the effluent from a two-stage operation consisting of a first stage in which hydrogen, carbon monoxide and an olefin are contacted in the presence of a hydroformylation catalyst yielding a predominantly aldehyde product and of a second stage in which the said aldehyde is catalytically reduced with hydrogen to form the corresponding alcohol fraction, which comprises contacting the distilled alcohol fraction at from about 25° C. to about 200° C. with from about 0.001% to about 0.1% by weight of an alkali metal borohydride and separating a purified alcohol product fraction having substantially reduced tendencies to produce color in subsequent reactions.

19. The process of claim 18 in which the alcohol being purified is a $C_8$ alcohol.

20. The process of claim 18 in which said alkali metal borohydride is lithium borohydride.

21. The process of claim 18 in which said alkali metal borohydride is sodium borohydride.

22. The process of claim 18 in which said alkali metal borohydride is potassium borohydride.

23. In a process for producing an ester of an organic carboxylic acid by reaction of an aliphatic alcohol of Oxo process origin with a member of the group consisting of organic polycarboxylic acids and anhydrides of organic polycarboxylic acids, the improvement which comprises conducting the esterification in the presence of from about 0.001% to about 1.0% by weight based on the weight of said alcohol of a metal borohydride selected from the group consisting of alkali metal borohydrides and alkaline earth metal borohydrides.

24. The process of claim 23 in which said anhydride is phthalic anhydride and said alcohol contains from 4 to 15 carbon atoms.

25. The process of claim 24 wherein said metal borohydride is sodium borohydride.

26. A process for the treatment of a water immiscible alcohol fraction containing at least about 4 carbon atoms per molecule produced by an Oxo process, in which an olefin is hydroformylated at an elevated temperature in contact with a hydroformylation catalyst and the hydroformylation product is catalytically reduced to produce said alcohol fraction containing connate impurities, which process comprises contacting said alcohol fraction with a metal borohydride selected from the class consisting of alkali metal borohydrides and alkaline earth metal borohydrides in an effective proportion of at least about 0.001% by weight and sufficient to destroy connate impurities in said alcohol fraction which have color-producing tendencies in a subsequent phthalation reaction of said alcohol fraction, and thereafter separating a purified alcohol fraction having a substantially reduced phthalation color.

27. The process of claim 26 wherein contact of said alcohol fraction is effected by passage through a filter containing an inert filtering medium mixed with said metal borohydride.

References Cited in the file of this patent

UNITED STATES PATENTS

| | | |
|---|---|---|
| 1,681,238 | James | Aug. 21, 1928 |
| 1,979,303 | Woodhouse | Nov. 6, 1934 |
| 2,043,688 | Woodhouse | June 9, 1936 |
| 2,525,354 | Hoog | Oct. 10, 1950 |
| 2,614,128 | Mertzweiller | Oct. 14, 1952 |
| 2,678,952 | Krebs | May 18, 1954 |

OTHER REFERENCES

Chaiken et al.: J. A. C. S., vol. 71, pp. 122–5 (1949).
Nystrom et al.: Ibid. pp. 3245–6 (1949).
Fuchs et al.: Nature, vol. 173, pp. 125–6 (1954).